3,165,517
2-(5-NITRO-FURFURYL)-MERCAPTO-
PYRIMIDINES
Donald C. Hobbs, Niantic, Conn., assignor to Chas.
Pfizer & Co., Inc., New York, N.Y., a corporation of
Delaware
No Drawing. Filed May 16, 1962, Ser. No. 195,305
4 Claims. (Cl. 260—251)

This invention relates to a new group of chemical compounds and to the preparation thereof. More particularly, the invention relates to novel derivatives of 2-mercaptopyrimidine which exhibit antifungal activity.

The compounds of the present invention may be represented by the following general formula:

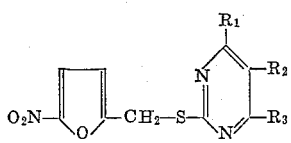

wherein $R_1$, $R_2$ and $R_3$ are each a member selected from the group consisting of hydrogen and lower alkyl groups.

It has been found that compounds of the general formula as hereinbefore disclosed and their salts exhibit unexpected biological activity, and more particularly, that these compounds exhibit anti-fungal properties. This permits their application in therapeutics, veterinary medicine, industry and agriculture. The compounds of this invention may be used in ointments and lotions for treatment of human and animal skin infections of fungal etiology. They may be used in sprays and dusts for agricultural applications, and they may be used in industrial applications as preservatives for fuels and oils.

These compounds may be employed in any of the forms conventionally employed for the application of antifungal agents. The compounds may be dispersed in a variety of ways. For example, they may be dispersed on an inert finely divided solid and employed as a dust. Suitable solid carriers are clay, talc, bentonite, as well as other carriers familiar to those in the art. The compounds may also be applied as a spray in a liquid carrier either as a solution in a solvent or as a suspension in a nonsolvent such as water. Suitable wetting agents may be incorporated when said compounds are applied as a suspension. The compounds of this invention may be used alone, mixed together, or mixed with carriers that are themselves active, such as other parasiticides, herbicides, etc.

The compounds of the present invention are readily prepared by the reaction of a nitrofurfuryl halide, such as 5-nitrofurfuryl chloride, with a 2-mercaptopyrimidine in the presence of a base such as sodium, and in a solvent such as anhydrous ethanol. A preferred procedure for the preparation of the compounds of the present invention comprises reacting substantially equimolar quantities of the reactants in the presence of a base in a suitable solvent at substantially reflux temperatures; thereafter, precipitating and isolating the reaction product. The reaction product is thence purified and recrystallized. Suitable solvents for the reaction include the lower alkanols, ketones and nitriles. Those containing up to five carbon atoms such as methanol, ethanol, acetone, methyl isopropyl ketone and acetonitrile are very useful. Satisfactory bases include sodium and amines such as diethylamine and triethylamine. It is to be understood that the reaction hereinbefore described may be carried out at temperatures other than reflux temperatures; however, reflux temperatures are preferred. Furthermore, it is not necessary to use exactly equimolar amounts of reactants. More or less than equimolar amounts of any reactant will work satisfactorily to give the desired product. However, for optimum results, it is preferred to use substantially equimolar amounts of reactants. The time necessary for carrying out the reaction is preferably from about one to about three hours. Isolation and purification of the compounds of this invention may be carried out by methods well known to those skilled in the art, as for example, recrystallization from a solvent such as acetone and column chromatography.

The compounds of this invention are active against a wide variety of microorganisms. Their high level of activity against a number of microorganisms responsible for certain diseases makes them ideally suitable as antifungal agents.

The following tests in vitro of 2-(5-nitrofurfurylmercapto)pyrimidine indicate the utility of the novel compounds of this invention as biologically active agents, particularly as useful anti-fungal agents. These tests were conducted by seeding agar slants containing various concentrations of the pure compound with the particular organism specified. The "minimum inhibitory concentration" (MIC) indicated in Table I is the minimum concentration of the compound in micrograms/milliliter at which growth of the microorganism failed to occur. The values represent tenfold serial dilutions.

TABLE I

| Organism: | MIC (mcg./ml.) |
| --- | --- |
| Microsporum canis | 1 |
| Trichophyton sulfureum | 1 |
| Trichophyton violaceum | 100 |
| Cryptococcus neoformans | 1 |
| Candida albicans 8 | 100 |
| Epidermophyton floccosum | 1 |
| Microsporum audouini | 1 |
| Trichophyton mentagrophytes | 100 |

The salts of these compounds can be readily prepared by treatment of an organic solvent solution of the compound with at least one equivalent of the acid. Pharmaceutically acceptable acid addition salts include, for example, the sulfate, hydrochloride, phosphate, maleate, acetate, citrate, succinate, tartrate, and others.

The syntheses of 2-(5-nitrofurfuryl mercapto)pyrimidine and substituted mercaptopyrimidines are more fully illustrated in the following examples. It is to be understood that the examples are given solely for the purpose of illustration only and are not to be construed as limitations of this invention, many apparent variations of which are possible without departing from the spirit or scope thereof.

EXAMPLE I 2-(5-Nitrofurfurylmercapto)Pyrimidine

A mixture of 305.5 g. 2-mercaptopyrimidine, 440.0 g. 5-nitrofurfuryl chloride, and 4.5 liters acetonitrile is stirred at room temperature under a nitrogen atmosphere while 275.0 g. triethylamine are added from a dropping funnel over a 5 minute period. The mixture is then refluxed at 65° for one hour. The dark mixture is cooled to 10° and filtered to remove triethylamine hydrochloride. The filtrate is concentrated to dryness in vacuo and the residue triturated with 4.0 liters acetone. The insoluble triethylamine hydrochloride is again removed by filtration and the filtrate decolorized with activated charcoal and then concentrated in vacuo to a volume of 1.2 liters. With vigorous stirring at room temperature, 10 liters of water are slowly added, separating crystalline material. The mixture is cooled to 0° and filtered, the cake being washed with water and air dried to give 566 g. of dark crude material.

The solid is taken up in 5 liters of benzene and filtered to remove about 30 g. of impurities. The filtrate is passed down a column packed with 2.5 kilograms of Florisil (activated magnesium silicate). A black band is held on the column and the product is eluted with 36 liters of benzene. The yellow eluate is concentrated in vacuo to dryness and the residue dissolved in 3.0 liters of methylene chloride. The solution is treated with activated charcoal, filtered, and the filtrate diluted with 4.0 liters of hexane and concentrated in vacuo to a volume of 1.0 liter. The mixture is cooled and filtered to give, after drying, 457 g. of yellow crystalline product, M. 85.0–86.0°. This is recrystallized from 3.0 liters of methylene chloride and 4.0 liters of hexane as above. The 2-(5-nitrofurfurylmercapto)pyrimidine is collected by filtration, washed with hexane, and dried in a vacuum desiccator to give 447 g. of product, M.P. 85.2–86.2° C. The elemental analysis calculated for $C_9H_7N_3O_3S$ is 45.6% carbon, 3.0% hydrogen, 17.7% nitrogen and 13.5% sulfur. The balance is accounted for by oxygen. The analysis found is 45.6% carbon, 2.8% hydrogen, 17.7% nitrogen and 13.4% sulfur.

EXAMPLE II

*2-(5-Nitrofurfurylmercapto)-4-Methylpyrimidine*

Eleven and one-half grams of sodium are dissolved in 1200 ml. of absolute ethanol. To this solution are added 63 g. of 2-mercapto-4-methylpyrimidine, followed by 80 g. of 5-nitrofurfuryl chloride. The mixture is heated at reflux temperatures for 2 hours. The mixture is thereafter cooled. The crude product is precipitated and filtered. The precipitate is taken up with several portions of acetone. The filtrate is distilled to remove the solvent. The residue is dissolved in acetone and this solution is combined with the acetone-soluble portion of the initial precipitate. The combined acetone solution is decolorized with carbon. The solution is concentrated to incipient cloudiness at elevated temperatures and allowed to cool. 2 - (5 - nitrofurfurylmercapto)-4-methylpyrimidine is obtained as a crystalline product.

EXAMPLE III

*2-(5-Nitrofurfurylmercapto)-4,6-Dimethylpyrimidine*

Eleven and one-half grams of sodium are dissolved in 1300 ml. of absolute ethanol. To this solution are added 70 g. of 2-mercapto-4,6-dimethylpyrimidine, followed by 80 g. of 5-nitrofurfuryl chloride. The mixture is thereafter treated in the manner as set forth in Example II. 2-(5-nitrofurfurylmercapto)-4,6-dimethylpyrimidine is obtained as a crystalline product.

EXAMPLE IV

*2-(5-Nitrofurfurylmercapto)pyrimidine Hydrochloride*

Twenty grams of 2-(5-nitrofurfurylmercapto)pyrimidine are dissolved in benzene. Dry hydrogen chloride is passed into the solution. The precipitate is filtered and dried to yield 2-(5-nitrofurfurylmercapto)pyrimidine hydrochloride.

EXAMPLE V

*2-(5-Nitrofurfurylmercapto)-4,5,6-Trimethylpyrimidine*

Eleven and one-half grams of sodium are dissolved in 1300 ml. of absolute ethanol. To this solution are added 77 g. of 2-mercapto-4,5,6-trimethylpyrimidine, followed by 80 g. of 5 nitrofurfuryl chloride. The mixture is thereafter treated in the manner as set forth in Example II. 2-(5-nitrofurfurylmercapto) - 4,5,6 - trimethylpyrimidine is obtained as a crystalline product.

EXAMPLE VI

*2-(5-Nitrofurfurylmercapto)-4-Methyl-6-Ethylpyrimidine*

Eleven and one-half grams of sodium, 77 g. of 2-mercapto-4-methyl-6-ethylpyrimidine, and 80 g. of 5-nitrofurfuryl chloride in 1250 ml. of absolute ethanol are reacted in the manner set forth in Example II. 2-(5-nitrofurfurylmercapto)-4-methyl-6-ethylpyrimidine is obtained as a crystalline product.

What is claimed is:

1. A compound selected from the group consisting of those of the formula:

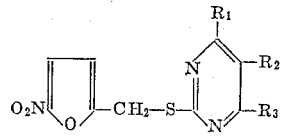

and the pharmaceutically acceptable acid addition salts thereof wherein $R_1$, $R_2$ and $R_3$ are each a member selected from the group consisting of hydrogen and lower alkyl.
2. 2-(5-nitrofurfurylmercapto)pyrimidine.
3. 2-(5-nitrofurfurylmercapto)-4-methylpyrimidine.
4. 2-(5-nitrofurfurylmercapto)-4,6-dimethylpyrimidine.

References Cited by the Examiner
UNITED STATES PATENTS

| 2,876,223 | 3/59 | Bloom | 260—256.4 |
| 2,994,637 | 8/61 | Blimber | 167—33 |
| 3,005,750 | 10/61 | Fluck et al. | 167—33 |
| 3,016,379 | 1/62 | Lloyd | 260—251 |
| 3,025,295 | 3/62 | Tweit | 260—251 |
| 3,096,332 | 7/63 | Von Esch et al. | 260—251 |

IRVING MARCUS, *Primary Examiner.*

NICHOLAS S. RIZZO, WALTER A. MODANCE,
*Examiners.*